(12) United States Patent
Jang et al.

(10) Patent No.: US 11,433,842 B2
(45) Date of Patent: Sep. 6, 2022

(54) SIDE AIRBAG APPARATUS

(71) Applicant: HYUNDAI MOBIS CO., LTD., Seoul (KR)

(72) Inventors: Rae Ick Jang, Yongin-si (KR); Seok Min Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/072,911

(22) Filed: Oct. 16, 2020

(65) Prior Publication Data

US 2021/0114543 A1 Apr. 22, 2021

(30) Foreign Application Priority Data

Oct. 18, 2019 (KR) ................. 10-2019-0129890

(51) Int. Cl.
| | |
|---|---|
| *B60R 21/207* | (2006.01) |
| *B60R 21/231* | (2011.01) |
| *B60N 2/06* | (2006.01) |
| *B60R 21/0134* | (2006.01) |
| *B60R 21/262* | (2011.01) |
| *B60R 21/017* | (2006.01) |
| *B60N 2/427* | (2006.01) |
| *B60N 2/42* | (2006.01) |
| *B60R 21/01* | (2006.01) |
| *B60R 21/26* | (2011.01) |

(52) U.S. Cl.
CPC .............. *B60R 21/207* (2013.01); *B60N 2/06* (2013.01); *B60N 2/4235* (2013.01); *B60N 2/4279* (2013.01); *B60N 2/42736* (2013.01); *B60R 21/017* (2013.01); *B60R 21/0134* (2013.01); *B60R 21/23138* (2013.01); *B60R 21/262* (2013.01); *B60R 2021/01231* (2013.01); *B60R 2021/23107* (2013.01); *B60R 2021/23146* (2013.01); *B60R 2021/26082* (2013.01)

(58) Field of Classification Search
None
See application file for complete search history.

(56) References Cited

U.S. PATENT DOCUMENTS

| | | | | |
|---|---|---|---|---|
| 9,457,751 | B1 * | 10/2016 | Stancato | B60N 2/42754 |
| 10,864,877 | B2 * | 12/2020 | Nagasawa | B60R 21/207 |
| 11,052,858 | B2 * | 7/2021 | Lee | B60R 21/207 |
| 2020/0298984 | A1 * | 9/2020 | Walker | B64D 11/06205 |

FOREIGN PATENT DOCUMENTS

JP 10278556 A * 10/1998

* cited by examiner

*Primary Examiner* — Faye M Fleming
(74) *Attorney, Agent, or Firm* — DLA Piper LLP (US)

(57) ABSTRACT

A side airbag apparatus may include: a seat on which a passenger is seated; an inflator mounted on the seat, and configured to jet gas; a cushion inflated by the gas jetted from the inflator, and deployed toward the passenger so as to move the passenger to an inboard side of the vehicle; and a controller configured to operate the inflator to deploy the cushion before the collision of the vehicle, according to driving information of the vehicle, based on a signal of a sensor mounted on the vehicle.

12 Claims, 8 Drawing Sheets

SIDE AIRBAG APPARATUS

CROSS-REFERENCE TO RELATED APPLICATION

This application claims priority from and the benefit of Korean Patent Application No. 10-2019-0129890, filed on Oct. 18, 2019, which is hereby incorporated by reference for all purposes as if set forth herein.

BACKGROUND

Field

Exemplary embodiments of the present disclosure relate to a side airbag apparatus, and more particularly, to a side airbag apparatus capable of preventing an injury to a passenger, which is caused by deformation in a vehicle in case of a side collision of the vehicle.

Discussion of the Background

A side airbag (SAB) of a vehicle is deployed in case of a side collision of the vehicle, in order to reduce an injury to a passenger. In general, a reduction in injury in case of a side collision of a vehicle is decided according to deformation in the vehicle rather than an airbag.

In the related art, there is a limitation in reducing an injury to a passenger only with the side airbag, when the vehicle is significantly deformed. In particular, when the vehicle is significantly deformed, the chest and pelvis of a passenger may be severely injured even though the side airbag has excellent performance. Therefore, there is a need for a device capable of solving the problem.

SUMMARY

Various embodiments are directed to a side airbag apparatus capable of preventing an injury to a passenger, which is caused by deformation in a vehicle in case of a side collision of the vehicle.

In an embodiment, a side airbag apparatus may include: a seat on which a passenger is seated; an inflator mounted on the seat, and configured to jet gas; a cushion inflated by the gas jetted from the inflator, and deployed toward the passenger so as to move the passenger to an inboard side of a vehicle; and a controller configured to operate the inflator to deploy the cushion before the collision of the vehicle, according to driving information of the vehicle, based on a signal of a sensor mounted on the vehicle.

The inflator may include: a first body part having gas contained therein, and mounted in the seat; a second body part detachably coupled to the first body part; and a hose part mounted in the second body part, and configured to supply gas to the cushion.

The inflator may further include a packing part configured to cover an outer surface of a connector wire which is electrically connected to the first body part through a through-hole of the second body part, and mounted in the through-hole.

The gas contained in the first body part may be cold gas. The cold gas may include nitrogen oxide.

The second body part may be made of a material having higher strength and hardness than the first body part.

The cushion may be fixed to the seat toward an inboard side of the vehicle from the outboard side of the vehicle.

The cushion may include: a first cushion part mounted upward in the center of a side part of the seat, facing a side of the passenger; and a second cushion part mounted on a hip seating part of the seat, facing the hip of the passenger.

The first and second cushion parts may be individually deployed according to a signal of the controller.

The controller may deploy the first cushion part when a first accident condition is satisfied by driving information of the vehicle through the signal of the sensor.

The controller may deploy the first and second cushion parts when a second accident condition having a higher accident risk than the first accident condition is satisfied by the driving information of the vehicle through the signal of the sensor.

The side airbag apparatus may further include a moving part configured to move the seat to the inboard side of the vehicle before a collision of the vehicle, according to the signal of the controller.

The moving part may include: a rail part installed in the vehicle in a widthwise direction of the vehicle, such that the seat is movably seated on the rail part; and a driving part configured to move the seat to the inboard side of the vehicle along the rail part.

In accordance with the embodiments of the present disclosure, the side airbag apparatus may move the passenger to the inboard side of the vehicle before a collision of the vehicle, thereby reducing an injury to the passenger.

Furthermore, the side airbag apparatus may selectively deploy the first and second cushion parts of the cushion through the driving information of the vehicle, sensed by the sensor, thereby safely protecting the passenger.

Furthermore, since the inflator jets cold gas, the side airbag apparatus can reduce noise further than in a gunpowder explosion method.

Furthermore, since the inflator using the cold gas jetting method is used, the production cost may be reduced further than in the gunpowder explosion method, which makes it possible to improve the productivity.

DETAILED DESCRIPTION OF THE ILLUSTRATED EMBODIMENTS

Hereinafter, a side airbag apparatus will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
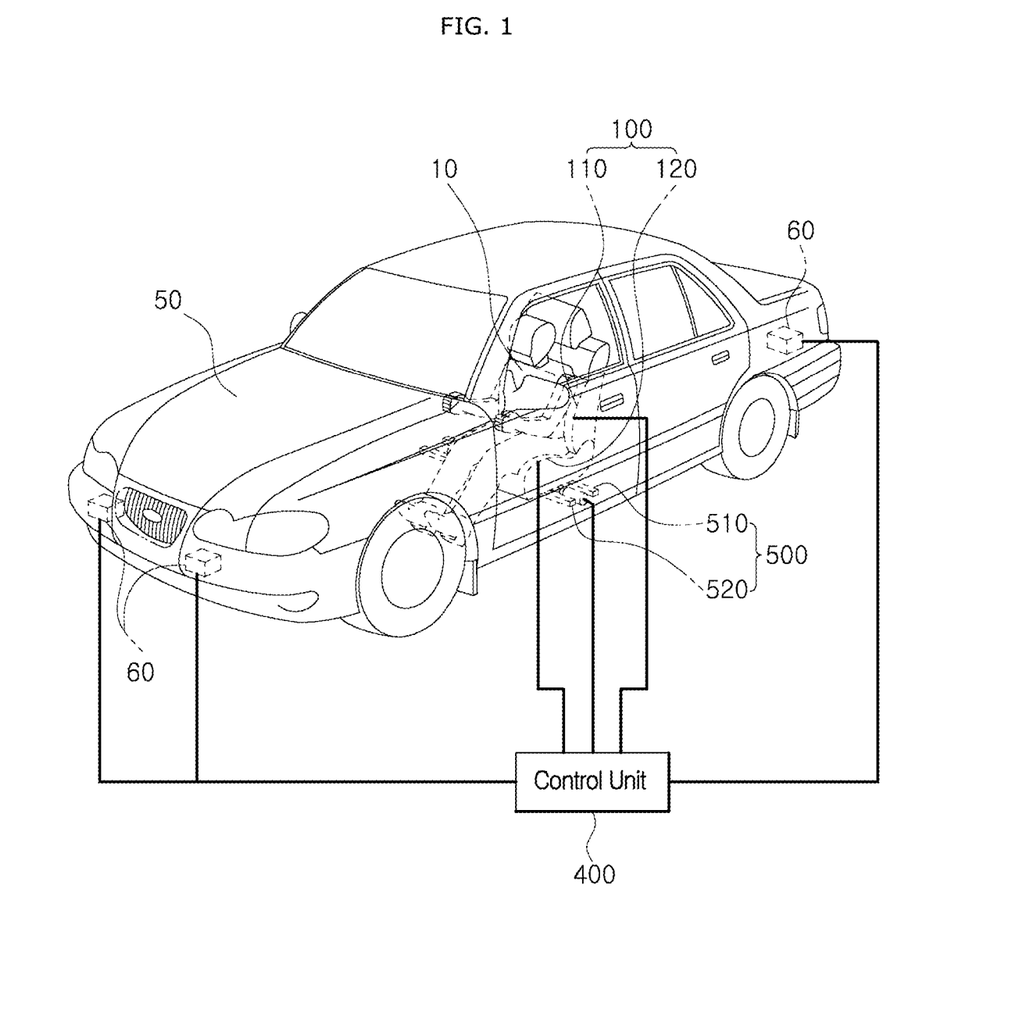
FIG. 1 is a perspective view schematically illustrating a vehicle in which a side airbag apparatus in accordance with an embodiment of the present disclosure is mounted.
Figure 2:
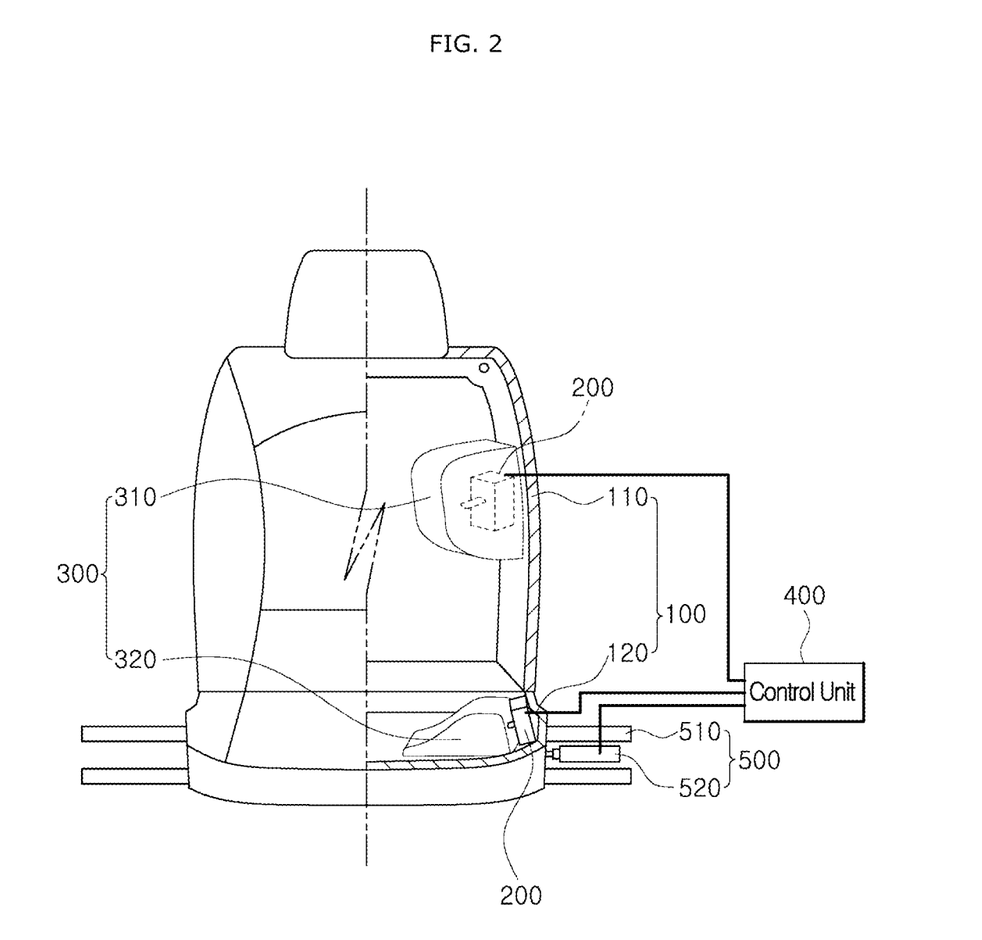
FIG. 2 is a partially cutaway view schematically illustrating the side airbag apparatus in accordance with the embodiment of the present disclosure.
Figure 3:
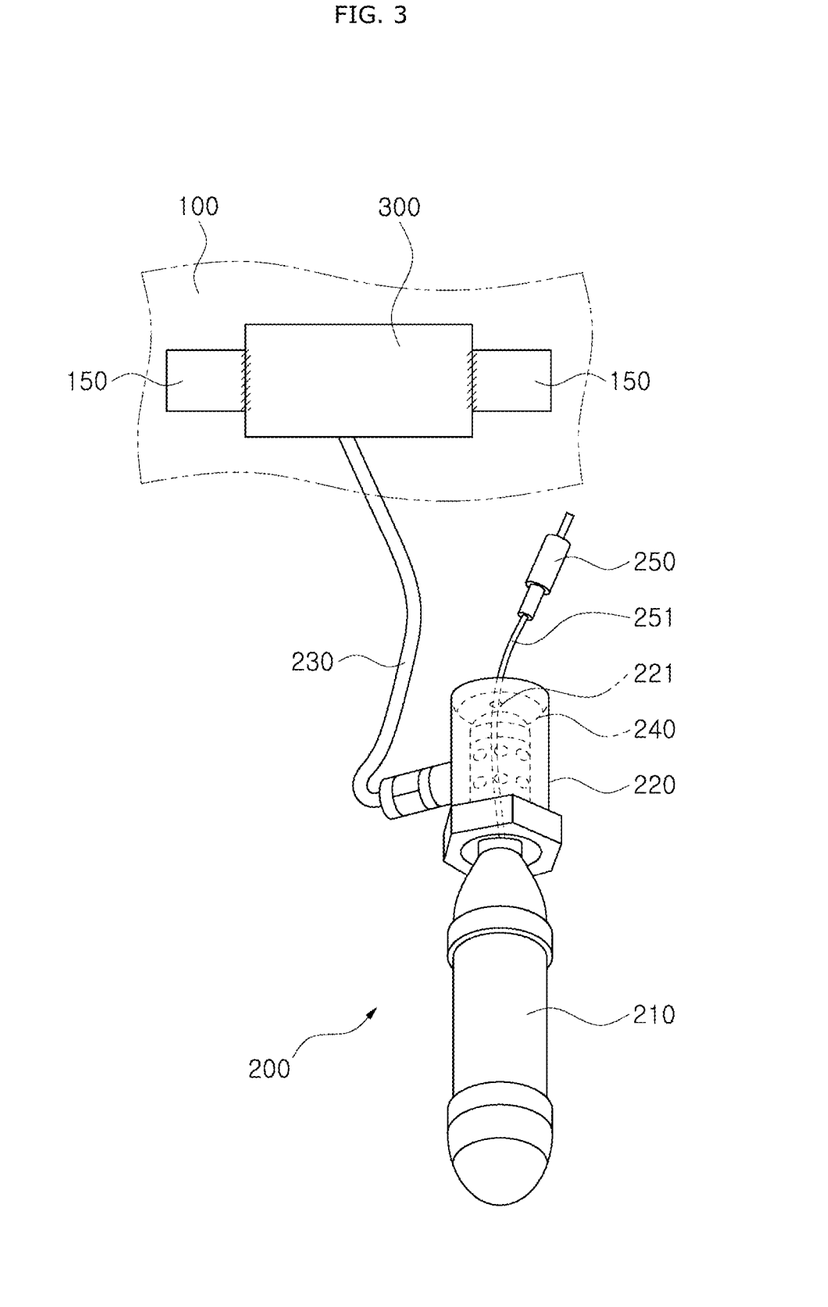
FIG. 3 is a perspective view schematically illustrating an inflator in the side airbag apparatus in accordance with the embodiment of the present disclosure.
Figure 4:
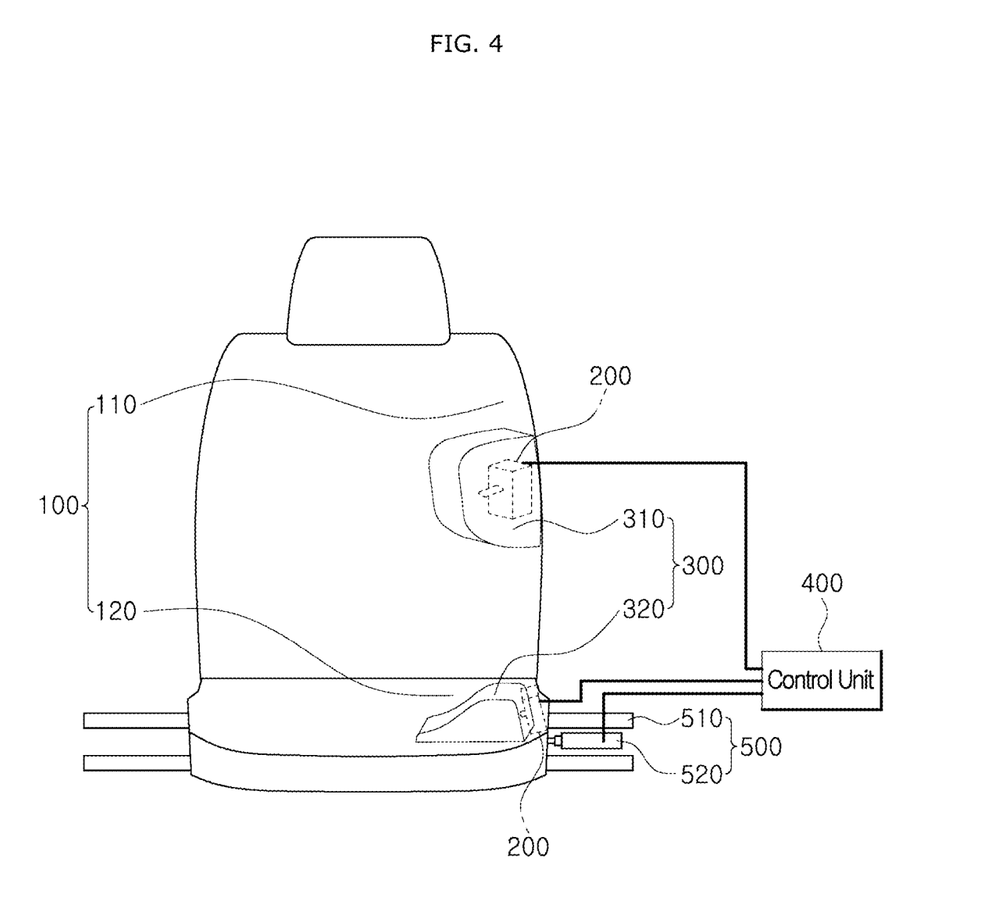
FIG. 4 is a perspective view schematically illustrating the side airbag apparatus in accordance with the embodiment of the present disclosure.
Figure 5:
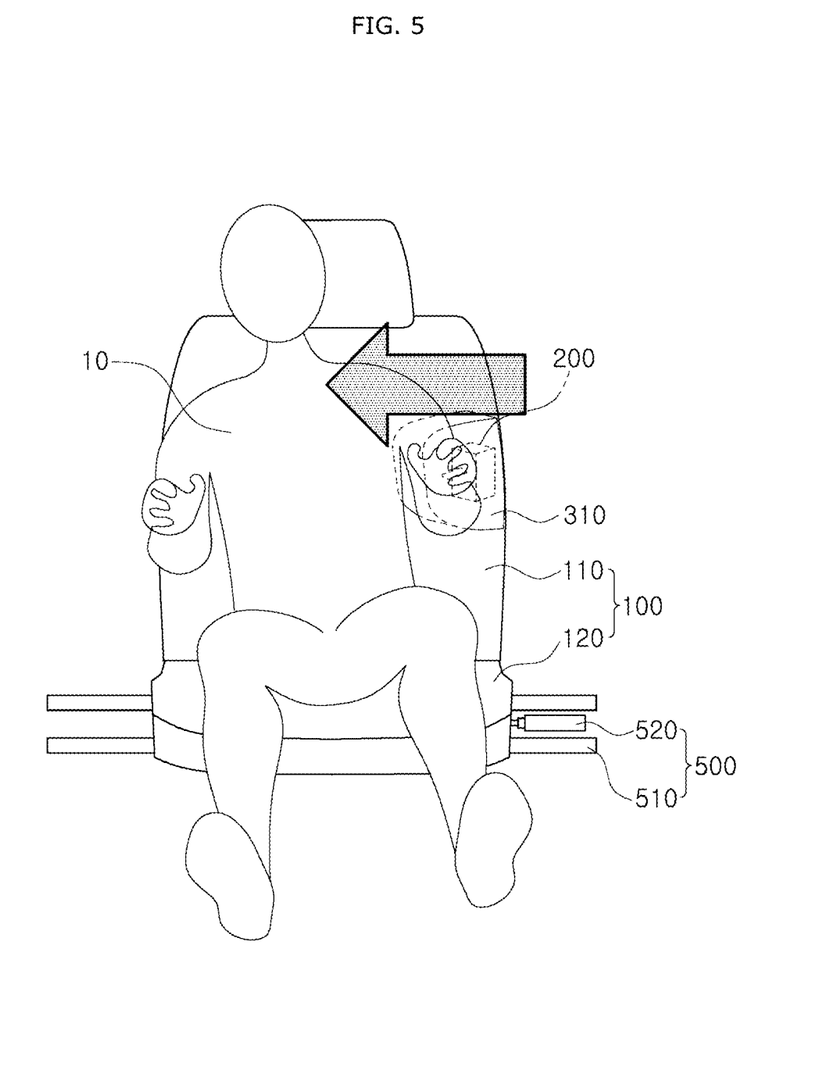
FIG. 5 is conceptual view schematically illustrating a first operation of the side airbag apparatus in accordance with the embodiment of the present disclosure.
Figure 6:
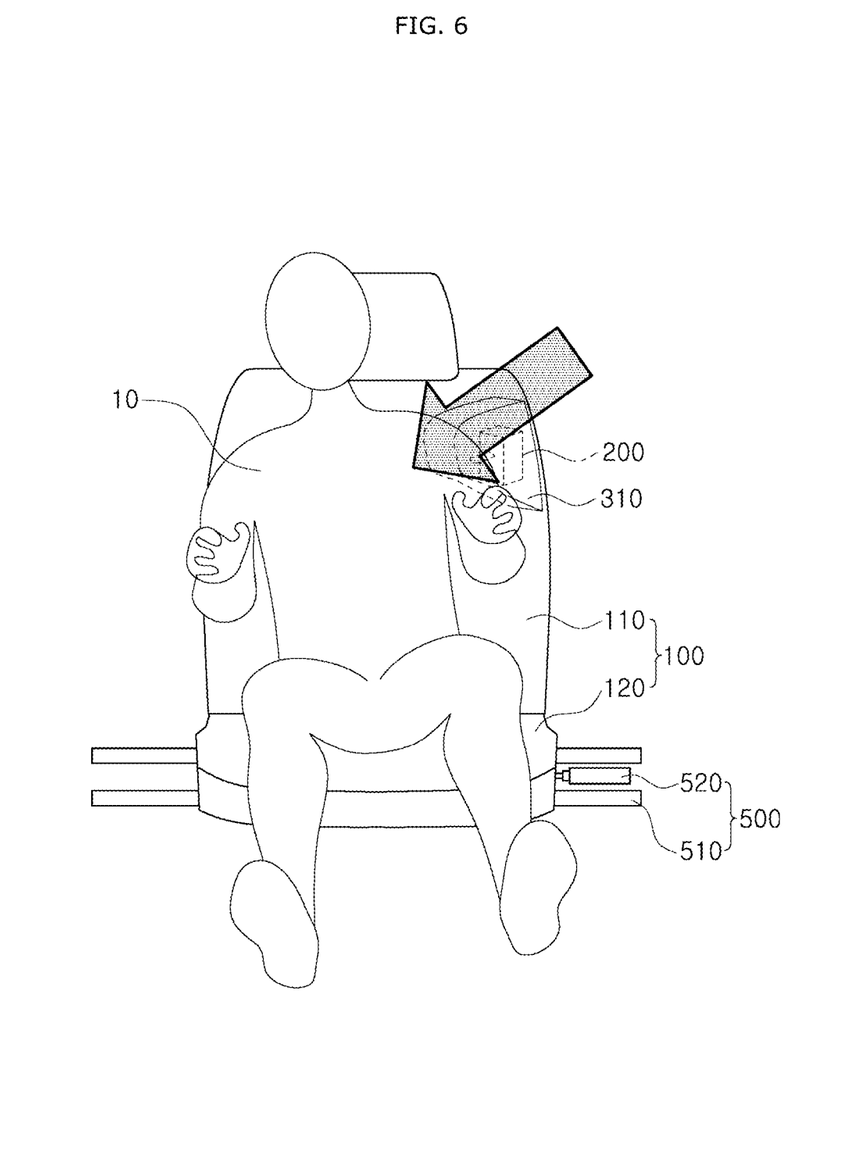
FIG. 6 is a conceptual view schematically illustrating a second operation of the side airbag apparatus in accordance with the embodiment of the present disclosure.
Figure 7:
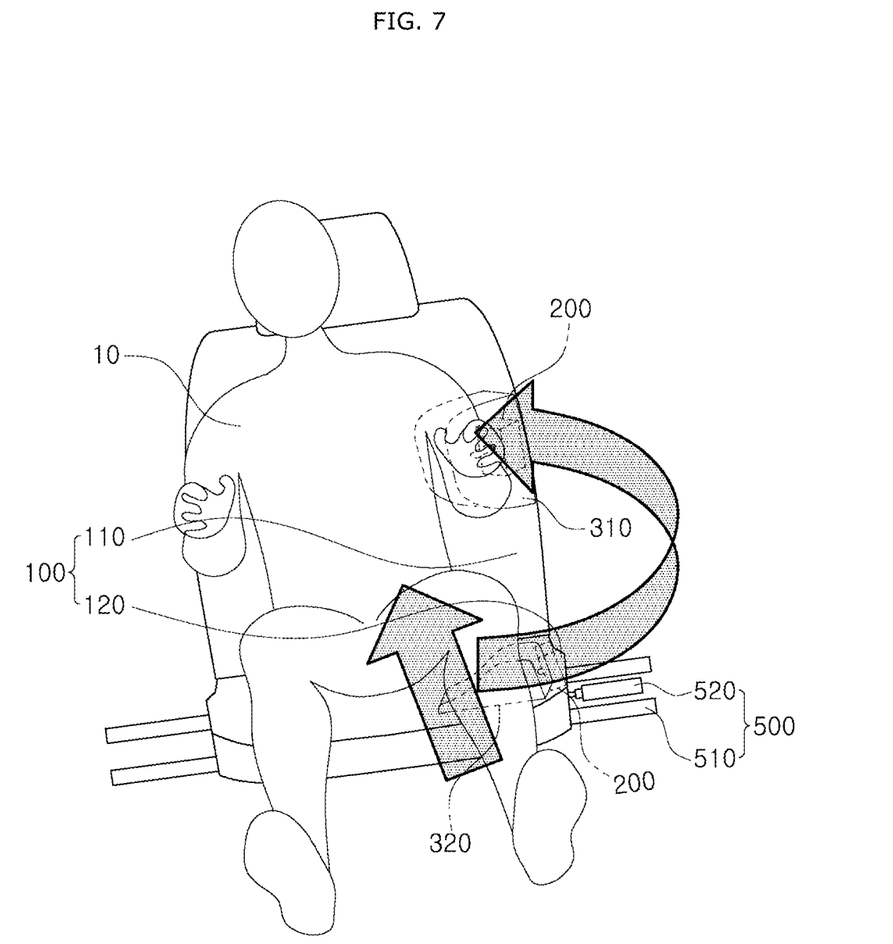
FIG. 7 is a conceptual view schematically illustrating a third operation of the side airbag apparatus in accordance with the embodiment of the present disclosure.
Figure 8:
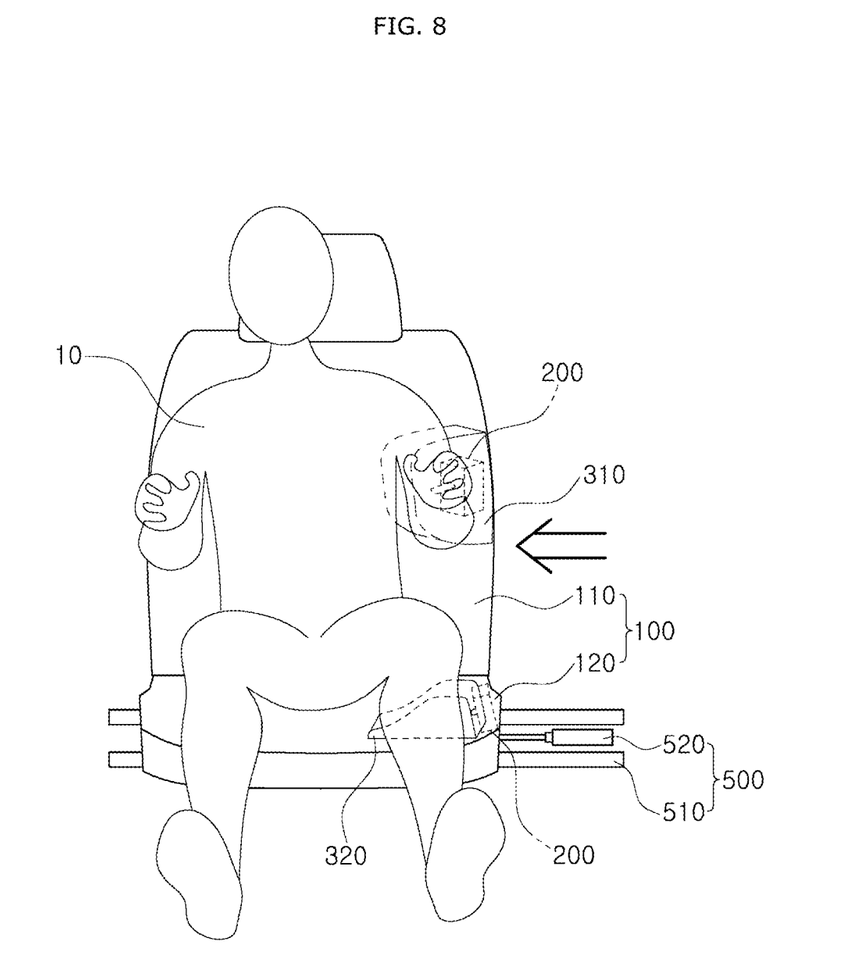
FIG. 8 is a conceptual view schematically illustrating a fourth operation of the side airbag apparatus in accordance with the embodiment of the present disclosure.

FIG. 1 is a perspective view schematically illustrating a vehicle in which a side airbag apparatus in accordance with an embodiment of the present disclosure is mounted, FIG. 2 is a partially cutaway view schematically illustrating the side airbag apparatus in accordance with the embodiment of the present disclosure, FIG. 3 is a perspective view schematically illustrating an inflator in the side airbag apparatus in accordance with the embodiment of the present disclosure, FIG. 4 is a perspective view schematically illustrating the side airbag apparatus in accordance with the embodiment of the present disclosure, FIG. 5 is conceptual view schematically illustrating a first operation of the side airbag apparatus in accordance with the embodiment of the present disclosure, FIG. 6 is a conceptual view schematically illustrating a second operation of the side airbag apparatus in accordance with the embodiment of the present disclosure, FIG. 7 is a conceptual view schematically illustrating a third operation of the side airbag apparatus in accordance with the embodiment of the present disclosure, and FIG. 8 is a conceptual view schematically illustrating a fourth operation of the side airbag apparatus in accordance with the embodiment of the present disclosure.

Referring to FIGS. 1 to 8, the side airbag apparatus in accordance with the embodiment of the present disclosure includes a seat 100, an inflator 200, a cushion 300 and a controller 400.

The seat 100 on which a passenger 10 is seated is mounted in an internal space of a vehicle 50. The seat 100 has the inflator 200 and the cushion 300 mounted therein. The seat 100 includes a side part 110 and a hip seating part 120.

The side part 110 and the hip seating part 120 are disposed in the seat 100 so as to face the outboard side (right side in FIG. 1) of the vehicle. The side part 110 is disposed to face the upper body of the passenger 10, and the hip seating part 120 is disposed to face the hip of the passenger 10. The side part 110 includes the inflator 200 and a first cushion part 310 of the cushion 300, which are mounted therein, and the hip seating part 120 includes the inflator 200 and a second cushion part 320 of the cushion 300, which are mounted therein. Each of the side part 110 and the hip seating part 120 has the inflator 200 mounted therein.

The inflator 200 is mounted in the seat 100, and jets gas to inflate the cushion 300. The inflator 200 is mounted in each of the first and second cushion parts 310 and 320, and separately inflates the corresponding cushion part.

The inflator 200 includes a first body part 210, a second body part 220 and a hose part 230. The first body part 210 has gas contained therein, and is mounted in the seat 100.

The gas contained in the first body part 210 is cold gas. The cold gas is nontoxic gas, and does not include solid particles which may form hot spots to damage the inner wall of the cushion 300. Furthermore, since the temperature of the cold gas is low, the cold gas may prevent damage to the cushion 300, and prevent an injury to the passenger 10 when the cushion 300 is deployed. Furthermore, the cold gas may generate almost no noise, and thus not give an unpleasant feeling to the passenger 10.

The cold gas contained in the first body part 210 includes nitrogen oxide. In the present embodiment, the nitrogen oxide includes ammonium nitrate ($NH_4NO_3$) and the like. The ammonium nitrate maintains a stable state at room temperature.

The second body part 220 is detachably coupled to the first body part 210. The second body part 220 is screwed to the first body part 210. In the present embodiment, the second body part 220 has a screw thread formed on the inner surface thereof, and is fastened to a screw thread formed on the outer surface of the first body part 210. That is, the first body part 210 is housed in the second body part 220. The second body part 220 serves as a coupler through which a connector wire 251 of a connector part 250 disposed on one side (top side in FIG. 3) of the second body part 220 is coupled to the first body part 210.

The second body part 220 has a through-hole 221 formed on one side thereof, such that the connector wire 251 passes through the through-hole 221. The connector wire 251 is connected to the controller 400, and connects the through-hole 221 to the first body part 210. Through the connector wire 251, a signal of the controller 400 is transferred to the first body part 210, and the first body part 210 jets gas.

The second body part 220 is made of a material having higher strength and hardness than the first body part 210. Since the second body part 220 made of a material having higher strength and hardness than the first body part 210 can be collected and reused, the manufacturing cost can be reduced. In the present embodiment, the second body part 220 is made of a metallic material such as steel.

The hose part 230 is mounted in the second body part 220, and supplies gas of the first body part 210 to the cushion 300. The hose part 230 is formed of a flexible material, and inserted into the cushion 300 so as to inject gas into the cushion 300. An end (right end in FIG. 3) of the hose part 230 is mounted in the second body part 220 through a coupler such as a nut.

In the present embodiment, the inflator 200 further includes a packing part 240. The packing part 240 covers the outer surface of the connector wire 251 which is electrically connected to the first body part 210 through the through-hole 221 of the second body part 220, and is mounted in the through-hole 221.

The packing part 240 is mounted in the through-hole 221, in order to prevent gas leakage caused by the connector wire 251 which is electrically connected to the first body part 210 through the through-hole 221 of the second body part 220. The packing part 240 is formed of an elastically deformable material. The packing part 240 includes rubber, silicone and the like.

The packing part 240 may be elastically deformed to close the through-hole 221, thereby blocking gas from leaking through the through-hole 221. Thus, the packing part 240 may prevent a loss of gas of the first body part 210, which may occur while the gas is not supplied to the cushion 300.

The cushion 300 is inflated by the gas jetted by the inflator 200 and deployed toward the passenger 10 to move the passenger 10 to the inboard side of the vehicle 50. The inboard side of the vehicle 50 indicates facing the interior space of the vehicle 50. That is, the inboard side indicates a direction from the door of the vehicle 50 toward the interior space of the vehicle 50.

The cushion 300 has both ends fixed to the seat 100. The cushion 300 is fixed to the seat 100 toward the inboard side of the vehicle from the outboard side of the vehicle 50. The outboard side of the vehicle 50 indicates facing the outside of the vehicle 50.

The cushion 300 may have both ends fixed to the seat 100 toward the inboard side of the vehicle 50 from the outboard side of the vehicle 50 by a fixing part 150, and be deployed to protect the passenger 10 while moving the passenger 10 to the inboard side of the vehicle 50. The fixing part 150 may be fixed to the seat 100 through sewing or bonding, and sewed to both ends of the cushion 300 so as to fix the position of the cushion 300.

The cushion 300 includes the first cushion part 310 and the second cushion part 320. The first cushion part 310 is mounted upward in the center of the side part 110 of the seat 100, facing a side (shoulder) of the passenger 10. The second cushion part 320 is mounted in the hip seating part 120 of the seat 100, facing the hip of the passenger 10.

The first cushion part 310 may be deployed to move the passenger 10 to the inboard side of the vehicle 50 while pressing the shoulder of the passenger 10, and the second cushion part 320 may be deployed to move the passenger 10 to the inboard side of the vehicle 50 while lifting the hip of the passenger 10 such that the body of the passenger 10 is turned in one direction (counterclockwise direction in FIG. 7).

In the present embodiment, the first and second cushion parts 310 and 320 are individually deployed according to the signal of the controller 400. That is, according to the signal of the controller 400, the inflator 200 may jet gas to deploy one or both of the first and second cushion parts 310 and 320.

According to a signal of a sensor 60 mounted on the vehicle 50, the controller 400 operates the inflator 200 to deploy the cushion 300, before a collision of the vehicle 50. The plurality of sensors 60 are mounted at the front and rear of the vehicle 50, and transfer a driving state of the vehicle 50 and a driving state of a surrounding vehicle to the controller 400.

The controller 400 determines whether an accident of the vehicle 50 occurs, according to the signal sensed by the sensor 60, and operates the inflator 200 to deploy the cushion 300, before a collision of the vehicle 50.

The controller 400 deploys the first cushion part 310 when a first accident condition is satisfied by driving information of the vehicle 50 through the signal of the sensor 60.

Furthermore, the controller 400 deploys the first and second cushion parts 310 and 320 when a second accident condition having a higher accident risk than the first accident condition is satisfied by the driving information of the vehicle 50 through the signal of the sensor 60.

The first and second accident conditions are relative concepts, and the second accident condition indicates a condition having a higher accident risk than the first accident condition. The first and second accident conditions are preset, and the controller 400 determines whether the first or second accident condition is satisfied, based on the driving information of the vehicle 50 through the sensor 60.

In the present embodiment, according to the driving state of the vehicle 50, the controller 400 may operate the inflator 200 to deploy the cushion 300 before a collision of the vehicle 50, thereby not passively protecting the passenger 10, but actively protecting the passenger 10 in case of a collision of the vehicle 50.

The side airbag apparatus in accordance with the embodiment of the present disclosure further includes a moving part 500. According to the signal of the controller 400, the moving part 500 moves the seat 100 to the inboard side of the vehicle 50 before a collision of the vehicle 50. The side airbag apparatus in accordance with the embodiment of the present disclosure may control the moving part 500 as well as the cushion 300 to move the passenger 10 to the inboard side of the vehicle 50, in order to protect the passenger 10.

The moving part 500 includes a rail part 510 and a driving part 520. The rail part 510 is installed at the bottom of the vehicle 50 in the widthwise direction (side-to-side direction of FIG. 1) of the vehicle 50, and the seat 100 is movably seated on the rail part 510.

The driving part 520 is contacted with one side (right side in FIG. 1) of the seat 100, and moves the seat 100 to the inboard side of the vehicle 50 along the rail part 510. The driving part 520 may be configured as a cylinder or the like. The driving part 520 moves the seat 100 to the inboard side of the vehicle, while a rod of the cylinder is advanced and retreated.

Referring to FIGS. 5 to 8, the operation of the side airbag apparatus in accordance with the embodiment of the present disclosure will be described. The following descriptions relate to the operation of the cushion 300 or the moving part 500 according to the signal of the controller 400, before a collision of the vehicle 50.

Referring to FIG. 5, the controller 400 deploys the first cushion part 310 when the first accident condition is satisfied according to the driving state of the vehicle 50. The first cushion part 310 is deployed to press the shoulder of the passenger 10, and the passenger 10 is moved to the inboard side (left side in FIG. 5) of the vehicle 50.

Referring to FIG. 6, the first cushion part 310 is disposed in the side part 110 at a higher position than in FIG. 5. The controller 400 deploys the first cushion part 310 when the first accident condition is satisfied according to the driving state of the vehicle 50. The first cushion part 310 is deployed to press the shoulder of the passenger 10 in a lateral direction, and the passenger 10 is moved in a diagonal direction (from the right top to the left bottom in FIG. 6). Therefore, the passenger 10 is moved to the inboard side (left side in FIG. 6) of the vehicle 50.

Referring to FIG. 7, the controller 400 deploys both of the first and second cushion parts 310 and 320 when the second accident condition is satisfied according to the driving state of the vehicle 50. The first cushion part 310 is deployed to press the shoulder of the passenger 10, and the second cushion part 320 is deployed to turn the body of the passenger 10 in one direction (counterclockwise direction in FIG. 7) while lifting the hip of the passenger 10. Therefore, the passenger 10 is further moved to the inboard side (left side in FIG. 7) of the vehicle 50 than in FIG. 5 or 6.

Referring to FIG. 8, the controller 400 operates the moving part 500 according to the driving state of the vehicle 50. The moving part 500 moves the seat 100 to the inboard side (left side in FIG. 8) of the vehicle 50. Furthermore, while the first or second cushion part 310 or 320 as well as the moving part 500 is deployed, the passenger 10 may be moved to the inboard side of the vehicle 50. The first and second cushion parts 310 and 320 are individually deployed according to whether the first or second accident condition is satisfied.

The side airbag apparatus in accordance with the embodiment of the present disclosure may move the passenger 10 to the inboard side of the vehicle 50 before a collision of the vehicle 50, thereby reducing an injury to the passenger 10.

Furthermore, the side airbag apparatus may selectively deploy the first and second cushion parts 310 and 320 of the cushion 300 through the driving information of the vehicle 50, sensed by the sensor 60, thereby safely protecting the passenger 10.

Furthermore, since the inflator 200 jets cold gas, the side airbag apparatus can reduce noise further than in a gunpowder explosion method.

Furthermore, since the inflator 200 using the cold gas jetting method is used, the production cost may be reduced further than in the gunpowder explosion method, which makes it possible to improve the productivity.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A side airbag apparatus comprising:
a seat on which a passenger is seated;
an inflator mounted on the seat, and configured to jet gas;
a cushion inflated by the gas jetted from the inflator, and deployed toward the passenger so as to move the passenger to an inboard side of a vehicle; and
a controller configured to operate the inflator to deploy the cushion before the collision of the vehicle, according to driving information of the vehicle, based on a signal of a sensor mounted on the vehicle, wherein the inflator comprises:
a first body part having gas contained therein, and mounted in the seat;
a second body part detachably coupled to the first body part; and
a hose part mounted in the second body part, and configured to supply gas to the cushion.

2. The side airbag apparatus of claim 1, wherein the inflator further comprises a packing part configured to cover an outer surface of a connector wire which is electrically connected to the first body part through a through-hole of the second body part, and mounted in the through-hole.

3. The side airbag apparatus of claim 1, wherein the gas contained in the first body part is cold gas.

4. The side airbag apparatus of claim 3, wherein the cold gas comprises nitrogen oxide.

5. The side airbag apparatus of claim 1, wherein the second body part is made of a material having higher strength and hardness than the first body part.

6. The side airbag apparatus of claim 1, wherein the cushion is fixed to the seat toward an inboard side of the vehicle from the outboard side of the vehicle.

7. The side airbag apparatus of claim 1, wherein the cushion comprises:
a first cushion part mounted upward in the center of a side part of the seat, facing a side of the passenger; and
a second cushion part mounted on a hip seating part of the seat, facing the hip of the passenger.

8. The side airbag apparatus of claim 7, wherein the first and second cushion parts are individually deployed according to a signal of the controller.

9. The side airbag apparatus of claim 8, wherein the controller deploys the first cushion part when a first accident condition is satisfied by driving information of the vehicle through the signal of the sensor.

10. The side airbag apparatus of claim 9, wherein the controller deploys the first and second cushion parts when a second accident condition having a higher accident risk than the first accident condition is satisfied by the driving information of the vehicle through the signal of the sensor.

11. A side airbag apparatus comprising:
a seat for which a passenger is seated;
an inflator mounted on the seat, and configured to jet gas;
a cushion inflated by the gas jetted from the inflator, and deployed toward the passenger so as to move the passenger to an inboard side of a vehicle;
a controller configured to operate the inflator to deploy the cushion before the collision of the vehicle, according to driving information of the vehicle, based on a signal of a sensor mounted on the vehicle; and
a moving part configured to move the seat to the inboard side of the vehicle before a collision of the vehicle, according to the signal of the controller.

12. The side airbag apparatus of claim 11, wherein the moving part comprises:
a rail part installed in the vehicle in a widthwise direction of the vehicle, such that the seat is movably seated on the rail part; and
a driving part configured to move the seat to the inboard side of the vehicle along the rail part.

* * * * *